US011458915B2

(12) United States Patent
Onyekwelu (10) Patent No.: US 11,458,915 B2
(45) Date of Patent: Oct. 4, 2022

(54) VEHICLE SETTING ADJUSTMENT (71) Applicant: International Business Machines Corporation, Armonk, NY (US)

(72) Inventor: Adaoha Onyekwelu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 16/511,021

(22) Filed: Jul. 15, 2019

(65) Prior Publication Data
US 2021/0016731 A1 Jan. 21, 2021

(51) Int. Cl.
*B60R 16/037* (2006.01)
*G06N 3/04* (2006.01)
*G06N 3/08* (2006.01)

(52) U.S. Cl.
CPC ............ *B60R 16/037* (2013.01); *G06N 3/04* (2013.01); *G06N 3/08* (2013.01)

(58) Field of Classification Search
CPC .......... B60R 16/037; G06N 3/04; G06N 3/08; G06N 3/0454; G06F 3/167
See application file for complete search history.

(56) References Cited

U.S. PATENT DOCUMENTS

| | | | | |
|---|---|---|---|---|
| 5,822,707 A * | 10/1998 | Breed | ............... | B60R 21/01512 296/65.18 |
| 6,644,737 B2 | 11/2003 | Kohl et al. | | |
| 9,229,905 B1 * | 1/2016 | Penilla | ..................... | H04L 67/10 |
| 10,214,118 B1 | 2/2019 | Jain et al. | | |
| 10,223,751 B1 * | 3/2019 | Hutchinson | ......... | G06F 16/2365 |
| 10,821,897 B2 * | 11/2020 | Kim | ........................ | G06V 20/59 |
| 2010/0152950 A1 * | 6/2010 | Chin | ..................... | B60W 40/09 701/31.4 |
| 2014/0310739 A1 * | 10/2014 | Ricci | ....................... | G06F 21/31 725/75 |
| 2014/0319895 A1 | 10/2014 | Lange-Mao et al. | | |
| 2015/0066246 A1 * | 3/2015 | Martin | .................. | B60R 16/037 701/2 |
| 2015/0067805 A1 * | 3/2015 | Martin | .................... | G06F 16/58 726/7 |
| 2018/0229674 A1 | 8/2018 | Heinrich et al. | | |
| 2018/0251122 A1 * | 9/2018 | Golston | ............ | B60W 50/0098 |
| 2018/0281627 A1 | 10/2018 | Ali | | |
| 2019/0031145 A1 * | 1/2019 | Trelin | .................... | B60W 40/08 |
| 2019/0232974 A1 * | 8/2019 | Reiley | ................... | G06V 20/597 |
| 2021/0255468 A1 * | 8/2021 | Kim | ........................ | G01S 7/4817 |

FOREIGN PATENT DOCUMENTS

| | | |
|---|---|---|
| CN | 206568922 U | 10/2017 |
| CN | 206704003 U | 12/2017 |
| CN | 108657029 A * | 10/2018 ............... B60N 2/02 |

OTHER PUBLICATIONS

Mell et al., "The NIST Definition of Cloud Computing", Recommendations of the National Institute of Standards and Technology, Sep. 2011, 7 pages.

* cited by examiner

*Primary Examiner* — Peter D Nolan
*Assistant Examiner* — Anwar Mohamed
(74) *Attorney, Agent, or Firm* — James L. Olsen (57) ABSTRACT Aspects of the present disclosure relate to adjustment of vehicle settings based on sensor data. Sensor data of an individual can be collected. The sensor data can be matched to a template. A set of vehicle settings associated with the template can be determined. The set of vehicle settings can then be activated within a vehicle.

17 Claims, 7 Drawing Sheets

VEHICLE SETTING ADJUSTMENT

BACKGROUND

The present disclosure relates to vehicles and, more specifically, to adjusting vehicle settings.

Various controls have been developed and integrated into vehicles based on driver demands. These controls allow for adjustment of, for example, seat position, windows, heating and cooling, mapping and navigation, throttle, transmission, signals, lighting, mirrors, and wipers.

SUMMARY

Aspects of the present disclosure relate to a computer-implemented method for adjusting vehicle settings. The method can include collecting sensor data of an individual. The sensor data can be matched to a template. A set of vehicle settings associated with the template can be determined. The set of vehicle settings can then be activated within a vehicle.

Aspects of the present disclosure also relate to a system for adjusting vehicle settings. The system can include a vehicle having one or more processing circuits and a computer-readable storage medium storing instructions, which, when executed by the one or more processing circuits, are configured to cause the one or more processing circuits to perform a method for adjusting vehicle settings. The method performed by the one or more processing circuits can include collecting sensor data of an individual. The method can further include analyzing the sensor data and determining a set of vehicle settings based on the analysis. The set of vehicle settings can be activated. The set of vehicle settings can then be associated with a template, the template storing a set of characteristics indicated in the sensor data.

Aspects of the present disclosure also relate to a computer program product comprising a computer readable storage medium having program instructions embodied therewith, the program instructions executable by one or more processing circuits of a vehicle to cause the one or more processing circuits to perform a method for adjusting vehicle settings. The method can include collecting sensor data of an individual. The method can further include matching the sensor data to a template. A set of vehicle settings associated with the template can then be determined. The set of vehicle settings can then be activated within the vehicle.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward vehicles, and more specifically, to adjusting vehicle settings. While the present disclosure is not necessarily limited to such applications, various aspects of the present disclosure may be appreciated through a discussion of various examples using this context.

Various controls have been developed and integrated into vehicles based on driver demands. These controls allow for adjustment of, for example, seat position, windows, heating and cooling, mapping and navigation, throttle, transmission, signals, lighting, mirrors, and wipers. New vehicle settings are continually being developed. For example, in some vehicles, an "economy" driving mode assists drivers by improving fuel efficiency. Certain vehicles have self-driving controls (e.g., cruise control, lane control, follow-distance management, parking control, etc.). Some models allow for the adjustment of the steering wheel and pedal positions.

As vehicles become more popular, it is common for multiple individuals to share the same vehicle. Due to differences between individuals (including physical differences such as height), individuals may routinely find themselves adjusting the vehicle settings before each trip. This can become cumbersome on the driver, as they are required to meticulously revert the settings such that they are suitable for them. These issues even exist for individuals who do not share vehicles. For example, individuals who wear attire that affects their vehicle settings (e.g., work boots vs. dress shoes, flats vs. high heels, a suit and tie vs. gym clothes) may also be required to update their vehicle settings upon changing attire. For example, an individual wearing gym attire may prefer to have the windows down and the air conditioning (A/C) off, while the same individual may prefer to have the windows rolled up and the A/C on while wearing a suit. Similarly, an individual may prefer to have a first seat and pedal position while wearing tennis shoes, while the same individual may prefer to have a second seat and pedal position while wearing high heels. As such, there exists a need to automatically configure settings based on individual characteristics.

Aspects of the present disclosure relate to a technique for automatically adjusting vehicle settings based on sensor data collected from an individual. As an individual approaches a vehicle, sensor data (e.g., image data, audio data, and/or biometric data) can be collected such that the individual can be characterized. The vehicle settings can then be determined. In some embodiments, the vehicle settings are determined by matching the characteristics of the individual to a template. In some embodiments, the vehicle settings are dynamically determined based on the individual's characteristics. The vehicle settings can, in embodiments, be determined based on objects associated with the individual (e.g., object data indicating various objects possessed by a user), dimensional data of the individual (e.g., a height of the user), and/or an identity of the individual (e.g., determined using biometric identification by comparing a biometric sample to a biometric template). The determined vehicle settings can then be activated (e.g., by one or more processing circuits within the vehicle).

By automatically adjusting vehicle settings, for example, prior to, or upon entry of the vehicle, meticulous readjustment of vehicle settings can be avoided. For example, if a given individual alternates operation of a vehicle with another individual, the vehicle settings suitable for each respective individual can be activated prior to operation such that they do not require manual readjustment.

Further, aspects of the present disclosure can enable automatic vehicle setting adjustment for users who operate a vehicle under different vehicle settings. This can be completed by analyzing objects and/or dimensions of the user and dynamically readjusting their vehicle settings based on the observed objects and/or dimensions. This can enable vehicle settings to accommodate a user under a variety of situations, such as when the user is wearing different attire.

Aspects of the present disclosure can further prevent potential danger which can arise from users not manually readjusting settings when their circumstances change. For example, if vehicle settings were configured when a user was wearing high heels, and the user has since switched to flats, the seat position, mirror angle, pedal position, steering wheel position, etc. may not be suitable for the user anymore. If the user does not manually change their seat position, then the risk of an accident due to the incorrect settings could increase. Aspects of the present disclosure enable the seamless transition from one set of vehicle settings to another set of vehicle settings based on sensor data, which may prevent accidents due to improper vehicle setting configuration.

The aforementioned advantages are example advantages, and embodiments exist that can contain all, some, or none of the aforementioned advantages while remaining within the spirit and scope of the present disclosure.

Figure 1:
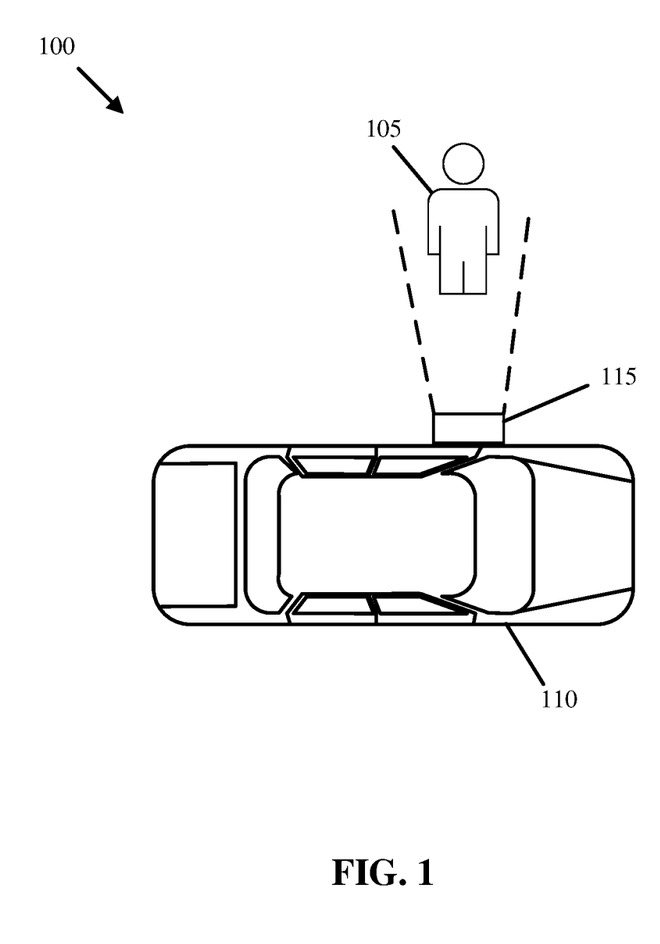
FIG. 1 illustrates a computing environment in which illustrative embodiments of the present disclosure can be implemented.

Referring now to FIG. 1, shown is a diagram of a computing environment 100 in which illustrative embodiments of the present disclosure may be implemented. The computing environment 100 includes an individual 105 approaching a vehicle 110. The vehicle 110 includes a sensor 115, which is configured to collect data associated with the individual 105.

The sensor 115 collects data which can be used to characterize the individual 105. The data collected by the sensor 115 can be analyzed by a processor to determine characteristics of the individual 105. As discussed herein, "characteristics" can refer to specific traits associated with an individual. These traits can include dimensions of the individual (e.g., height, width, etc.), objects associated with an individual (e.g., attire worn by an individual), and/or an identity of the individual. The processor can be configured to determine a set of vehicle settings based on the characteristics.

In some embodiments, the processor can match the characteristics to a template (e.g., a biological template, such as a voice print or facial template) stored within a user profile for the individual 105 to determine vehicle settings. For example, if the individual 105 is identified using facial recognition, default settings (previously determined or manually entered) for the individual 105 can be retrieved and enabled. In embodiments, each template is mapped to a set of vehicle settings, such that if a match between observed characteristics and a template occurs, a corresponding set of vehicle settings is retrieved and enabled. In embodiments, templates can be based on dimensions of the individual 105, objects (e.g., clothing, shoes, accessories, etc.) associated with the individual 105, and/or an identity of the individual 105. For example, a template can specify that if the individual 105 is wearing a particular outfit (e.g., gym attire), a particular set of vehicle settings is activated. As another example, a template can specify that an individual 105 measuring a particular height leads to activation of another set of vehicle settings.

In some embodiments, the vehicle settings are dynamically determined based on characteristics of the individual 105. That is, as opposed to, or in addition to, matching individual 105 characteristics to a template, in embodiments, the vehicle settings can be determined based on an analysis of the characteristics. For example, if a template does not exist for a given individual 105, a set of vehicle settings can be determined solely based on the characteristics determined for the individual 105. This can be completed based on the dimensions of the user and/or objects associated with the user. For example, the dimensions of the individual 105 can be determined (e.g., by analyzing images collected by the sensor 115), and vehicle settings can be automatically adjusted based on the dimensions (e.g., the position and angle of a car seat can be adjusted based on the user's height). As another example, a set of vehicle settings can be adjusted based on the observation of a particular object (e.g., an umbrella) associated with a user.

The sensor 115 can be configured to collect any suitable sensor data used to characterize the individual 105. In some embodiments, the sensor 115 collects image data. This can be used to aid in determining dimensions of the individual 105 (e.g., using photogrammetry techniques), objects associated with the individual 105 (e.g., using object recognition techniques), and/or an identity of the individual 105 (e.g., using facial recognition). In some embodiments, the sensor 115 collects audio data. This can be used to aid in identifying an individual 105, using speaker identification and/or speaker authentication techniques. In some embodiments, the sensor 115 can collect biometric data, such as fingerprints, iris pattern, vein pattern, and the like. These sensors can similarly be used to aid in identifying an individual 105.

In embodiments, the type of sensor 115 depends on the type of data to be collected. For example, if image data is collected, the sensor 115 can be a camera, if audio data is collected, the sensor 115 can be a microphone, and if fingerprint data is collected, the sensor 115 can be a fingerprint scanner. However, any suitable sensor 115 can be implemented. Further, the individual 105 can be characterized using any suitable sensor data.

Adjustments can be made to any suitable vehicle setting. For example, adjustments can be made to the seat position and angle, headrest position and angle, steering wheel position and angle, pedal position, windows, heating and cooling, lighting, signals, driving mode (e.g., economy, autonomous, cruise control, etc.), mirrors, sun/moon roof, wipers, etc. In embodiments, the adjustments made to the vehicle settings depend on the characteristics that were determined for the individual 105. For example, if characteristics determined for the individual 105 indicate that the individual 105 is three inches taller because they are wearing high heels, then the vehicle settings can be adjusted to accommodate the individual's updated height. In this example, the seat position, mirrors, steering wheel position, and/or pedal position can be adjusted to accommodate the height difference. This can be completed dynamically (e.g., by making adjustments commensurate with the user's change in height) and/or by referencing a template saved for the individual 105 corresponding to vehicle settings when the individual 105 wears high heels or measures a particular height.

Upon adjusting the vehicle settings, feedback can be requested from the individual 105. For example, when the individual 105 enters the vehicle and prepares to drive, the individual 105 can be prompted to provide feedback regarding the updated vehicle settings. If the individual 105 acknowledges that the vehicle settings are suitable, the settings can be associated with a template including the characteristics which yielded the appropriate settings. For example, if a new set of vehicle settings are adjusted and confirmed by a user wearing high heels, the vehicle settings can be saved in a template labeled "High Heels," such that any time in the future the user is wearing high heels, the appropriate vehicle settings can be activated. This can be completed by matching the characteristics of the user to the "High Heel" template (e.g., by observing high heels using object recognition) and fetching the corresponding vehicle settings.

If the individual 105 does not accept the vehicle settings, the individual 105 can be prompted to input their desired settings. Upon entering their desired settings, the desired settings can be associated with a template storing the characteristics which yielded the user's desired settings. This ensures that if the sensor 115 observes the same, or similar, characteristics stored in the template, the same vehicle settings can be activated.

FIG. 1 is intended to represent the major components of an example computing environment 100 according to embodiments of the present disclosure. In some embodiments, however, individual components can have greater or lesser complexity than shown in FIG. 1, and components other than, or in addition to those shown in FIG. 1 can be present. Furthermore, in some embodiments, various components illustrated in FIG. 1 can have greater, lesser, or different functionality than shown in FIG. 1. Further still, aspects of the present disclosure exist comprising only a subset of the components illustrated while remaining within the spirit and scope of the present disclosure.

Though this disclosure pertains to the collection of personal data (e.g., characteristics of individual 105), it is noted that in embodiments, users can opt-in to the system. In doing so, they are informed of what data is collected and how it will be used, that any collected personal data may be encrypted while being used, that the users can opt-out at any time, and that if they opt-out, any personal data of the user is deleted.

Figure 2:
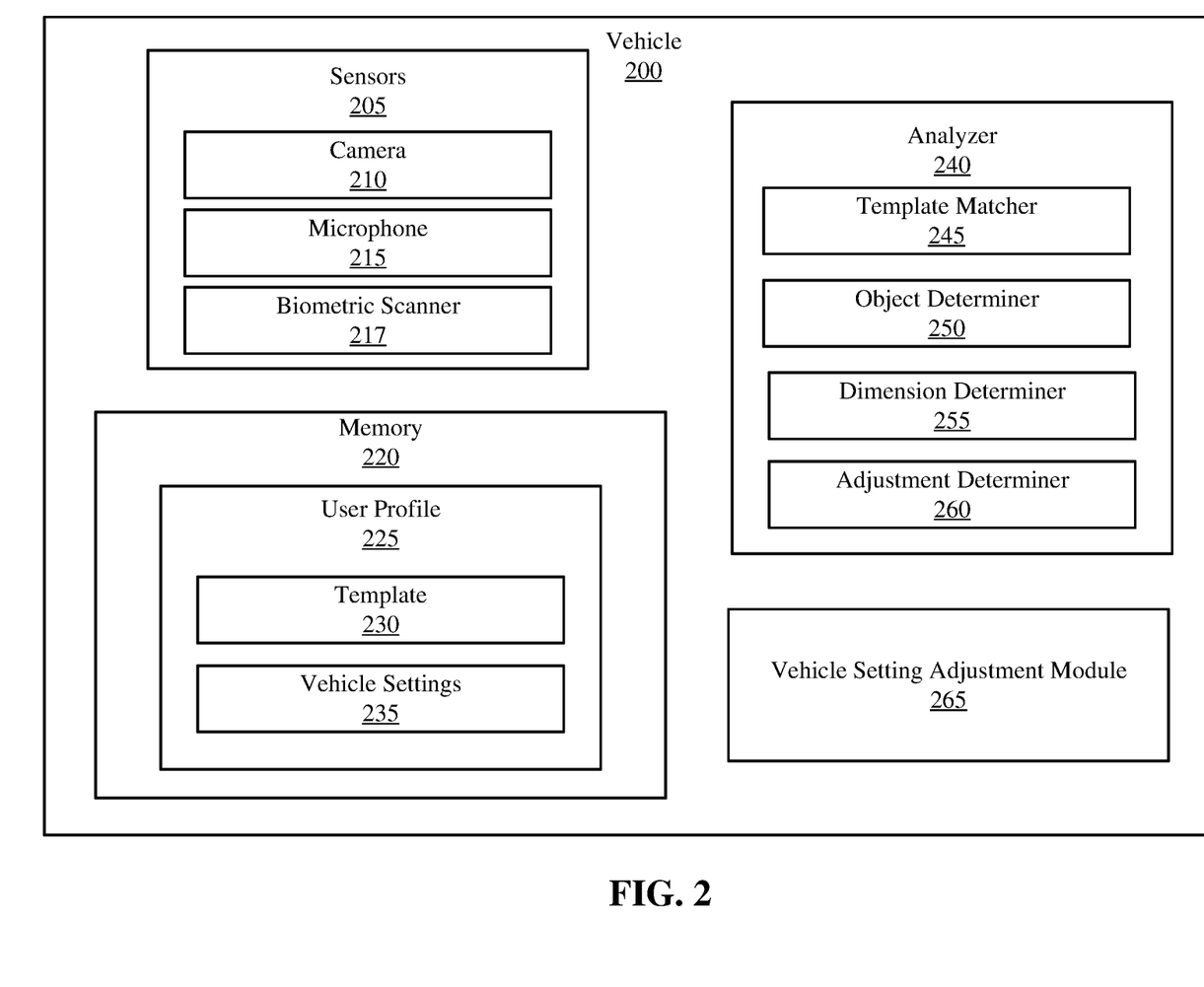
FIG. 2 illustrates a vehicle in which illustrative embodiments of the present disclosure can be implemented.

Referring now to FIG. 2, illustrated is a block diagram of a vehicle 200, in accordance with embodiments of the present disclosure. The vehicle 200 includes sensors 205, memory 220, an analyzer 240, and a vehicle setting adjustment module 265.

Vehicle 200 can comprise a semi-autonomous or fully autonomous vehicle, each possibly capable of fully manual operation according to various embodiments. Vehicle 200 can be a sedan, sport-utility-vehicle (SUV), truck, bus, all-terrain vehicle (ATV), aerial vehicle (e.g., plane, helicopter, quadcopter, etc.), train, ship (e.g., ferry, cruise liner, etc.), or a different form of vehicular transport. Aspects of the present disclosure recognize that setting adjustments can vary depending on the type of vehicle 200. For example, an airplane may have control settings for altitude adjustment while a boat may have control settings for motor elevation. The scope of the disclosure is intended to cover vehicle setting adjustments for a variety of vehicles and is not limited to any specific vehicle.

The sensors 205 of the vehicle 200 are configured to collect data which can be used to characterize an individual. Characterization of an individual can be used to match the individual to a template 230 stored within the memory 220 such that a set of vehicle settings 235 associated with the template 230 can be retrieved and enabled. Characterization of an individual can also be used to dynamically configure and/or adjust vehicle settings based on new characteristics which may not map to any templates 230 stored in the memory 220.

Template 230 can include stored characteristics of an individual which are mapped to a specific vehicle setting 235 configuration. For example, a "generic" template for a user can include default vehicle settings based on an individual's identity (e.g., stored as a biometric template). As another example, a "gym" template can include characteristics (e.g., tennis shoes, basketball shorts, a wearable device, etc.) mapping to vehicle settings configured for a user that is going to the gym.

In embodiments, multiple templates can be stored for a single individual, and each template can be mapped to a specific vehicle setting configuration. For example, a first template can be associated with a first set of vehicle settings based on a first outfit worn by the individual, while a second template can be associated with a second set of vehicle settings based on a second outfit worn by the individual. Each template 230 and respective vehicle setting 235 configuration is stored within a user profile 225.

In embodiments, a camera 210 is configured to collect image data used to characterize an individual. In some embodiments, the camera 210 collects a facial sample (e.g., used for facial recognition) of an individual associated with the vehicle 200. This can be used for identifying the individual prior to entering the vehicle 200. In some embodiments, the camera 210 can be configured to collect dimensions (e.g., height, length, and width) of the individual. This can be used to make dynamic adjustments to the vehicle settings based on the individual's dimensions. In some embodiments, the camera 210 can be configured to collect object data associated with an individual. As discussed herein, an "object" can refer to an item possessed by (e.g., equipped by, worn by, held by, etc.) a user which can affect their vehicle settings. For example, objects can include shoes, clothing, accessories, and the like.

In some embodiments, a microphone 215 is configured to collect data used to characterize an individual. For example, in embodiments, the microphone 215 can collect audio data used to identify (using speaker identification) an individual prior to entering the vehicle 200.

In some embodiments, a biometric scanner 217 can be configured to collect biometric data used to characterize an individual. The biometric scanner 217 can collect fingerprints, iris patterns, hand geometry, vein features, biomarkers, and other biometric features of a user. In embodiments, the type of biometric scanner 217 depends on the biometric feature to be collected. For example, in embodiments where a fingerprint is used to characterize an individual, the biometric scanner 217 is a fingerprint scanner. The biometric data (e.g., a facial sample, voice print, fingerprint, etc.) collected for each user can be converted into a secure format (e.g., a hash representation) and stored within the template 230 with a corresponding set of vehicle settings 235. Upon presentation of the biometric template (when entering the vehicle), analysis (e.g., minutiae comparison within a fuzzy commitment framework) can be completed to match the individual to their template 230 such that their vehicle settings 235 can be retrieved and enabled.

The analyzer 240 is configured to analyze the sensor data received from the sensors 205 to determine the appropriate setting adjustments to be made. The analyzer 240 includes a template matcher 245, an object determiner 250, a dimension determiner 255, and an adjustment determiner 260. The functionalities of the analyzer 240, template matcher 245, object determiner 250, dimension determiner 255, and adjustment determiner 260 can be processor executable instructions that can be executed by a dedicated or shared processor using received inputs. In some embodiments, one or more processing circuits of the vehicle 200 can be configured to perform the functionalities disclosed herein. In some embodiments, data can be transmitted over a network and processed remotely.

The template matcher 245 can be configured to match sensor data received from individuals (the individual's characteristics) to templates 230 stored within user profiles 225. This is completed because each template 230 can map to a set of vehicle settings 235, such that, when observed sensor data matches to a template, a corresponding set of vehicle settings is retrieved. The template matcher 245 can match sensor data received from an individual to a template 230 in any suitable matter.

In some embodiments, the template matcher 245 uses facial recognition to match the user data (e.g., received from camera 210) to a template 230. For example, a facial template stored within the individual's user profile 225 can be compared with an image (of an individual's face) received from camera 210 to determine whether there is a match. Facial recognition can include comparing an individual's facial textures, shape, and features to those within a facial template. A matching algorithm (e.g., principal component analysis, linear discriminant analysis, elastic bunch graph matching, a hidden Markov model (HMM), neuronal motivated dynamic link matching, etc.) can then be applied to determine whether there is a match between the sensor data and the template 230.

In some embodiments, voice recognition (e.g., speaker identification, speaker authentication, speaker verification, etc.) can be used to identify an individual. For example, the template matcher 245 can compare audio data (e.g., a speech sample) received from the microphone 215 to a voiceprint stored in a template 230. The audio data can then be matched to the voice print using a matching algorithm (e.g., cosine similarity, cohort models, frequency estimation, HMM, Gaussian mixture models (GMM), pattern matching, neural networks, matrix representation, vector quantization, and decision trees).

In some embodiments, other biometric authentication techniques can be used to match an individual to a template 230. For example, iris comparison, fingerprint comparison, vein comparison, etc. can be used to match an individual to a template 230. In some embodiments, an error tolerant, yet secure biometric authentication method such as fuzzy commitment can be implemented to retain concealing and binding properties of the biometric data while allowing some variation between samples.

In embodiments, in addition to or instead of identity, characteristics such as dimensions of a user and/or objects associated with a user can be matched to a template by the template matcher 245. As an example, a first template can specify that a first user matching a first identity and being associated with a first object leads to the selection of a first set of settings. In this example, if the template matcher 245 determines that the first user matches the first identity and is associated with the first object, then the template matcher 245 can match the first user to the first template such that the first set of settings corresponding to the first template can be retrieved and enabled. As another example, a second template can specify that a second user matching a second identity and measuring a first height leads to the selection of a second set of settings. In this example, if the template matcher 245 determines that the second user matches the second identity and measures the first height, then the template matcher 245 can match the second user to the second template such that the second set of settings corresponding to the second template can be retrieved and enabled.

In some embodiments, multiple objects and/or dimensions can be collectively considered and matched to a template by the template matcher 245. For example, a first template can specify that observation of a first object and a second object leads to the selection of a first set of vehicle settings. As another example, a second template can specify that observation of a first object, a second object, and a first dimension can lead to the selection of a second set of vehicle settings. A template can be matched to any suitable number of objects and/or dimensions.

The object determiner 250 can be configured to determine objects associated with an individual, to be used for matching the individual to a template 230 and/or dynamically determining vehicle settings for the individual. The object determiner 250 can determine objects associated with an individual in any suitable manner. In embodiments, the object determiner 250 can utilize object detection/recognition techniques, such as machine learning and/or deep learning object detection approaches. These techniques include, but are not limited to, region-based convolutional neural networks (R-CNN), fast region-based convolutional neural networks (Fast R-CNN), you only look once (YOLO), single shot multibox detector (SSD), scale-invariant feature transform (SIFT), histogram of oriented gradients (HOG) features, and others. The output of the object determiner 250 can include one or more identified objects with corresponding match certainties. The identified objects can then be associated with templates and/or used to dynamically determine vehicle settings.

The dimension determiner 255 can be configured to determine dimensions of an individual. The dimension determiner 255 can be configured to dimension individuals in any suitable manner. In embodiments, the dimension determiner 255 can utilize photogrammetry techniques, augmented reality (AR) based measuring techniques, and others. The dimensioning techniques performed by the dimension determiner 255 can utilize reference objects, multiple images captured from different angles/depths/positions, and/or trigonometric approximations. The output of the dimension determiner 255 can include the height, width, and length of an individual. The dimensions of an individual can be used to match the individual to a template and/or dynamically determine vehicle settings based on the dimensions.

The adjustment determiner 260 can be configured to determine the adjustments to be made to the vehicle settings based on data collected from the template matcher 245, object determiner 250, and dimension determiner 255. In embodiments, the adjustment determiner 260 can receive a template 230 match from the template matcher 245 and retrieve vehicle settings 235 associated with the template 230. In these embodiments, the adjustment determiner 260 determines the vehicle settings according to those stored within the user profile 225.

In some embodiments, the adjustment determiner 260 can be configured to determine vehicle adjustments to be made based on objects associated with an individual. For example, the adjustment determiner 260 can map particular objects (or sets of objects) to particular setting adjustments. In response to detecting a particular object, a corresponding vehicle setting adjustment can be made. For example, if the object determiner 250 transmits an object identity "umbrella" to the adjustment determiner 260, the adjustment determiner 260 can be configured to determine that the windows and sunroof should be in a closed state, as the observation of the umbrella may indicate that it is raining or will soon rain. As another example, if the object determiner 250 transmits an object identity "high heels" to the adjustment determiner 260, the adjustment determiner 260 can be configured to determine that the vehicle seat should be moved a set distance back from the seat position. This can be completed such that the seat settings accommodate the driver wearing high heels. As another example, if the object determiner 250 transmits an object identity "suit" to the adjustment determiner 260, then the adjustment determiner 260 can be configured to determine that the A/C of the vehicle 200 should be activated.

Though particular vehicle setting adjustments based on particular object observations are described, it is noted that any suitable vehicle setting adjustment determination based on any object observation can be made, and aspects of the present disclosure are not limited to those described.

In embodiments, the adjustment determiner 260 can be configured to automatically adjust settings based on the dimensions of an individual received from the dimension determiner 255. For example, if the dimension determiner 255 transmits a height measurement of 5 feet 10 inches to the adjustment determiner 260, then the adjustment determiner can be configured to determine adjustments to the mirrors (e.g., rear view and side mirrors), seat position, seat angle, wheel position, and/or pedal position based on the observed height. In these embodiments, the settings of the vehicle can be determined such that the dimensions of the individual are accommodated.

The adjustment determiner 260 then transmits the determined settings to the vehicle setting adjustment module 265. The vehicle setting adjustment module 265 then activates the settings determined by the adjustment determiner 260. In embodiments, the vehicle setting adjustment module 265 issues the setting adjustments through one or more processing circuits of a vehicle. In some embodiments, the vehicle setting adjustment module 265 issues the setting adjustments using a wireless link (e.g., Bluetooth) or wired connection.

The setting adjustments can be made via actuators present in the vehicle which are configured to adjust the respective settings. For example, a window lift motor actuator can be configured to receive a command from the vehicle setting adjustment module 265 to roll up the windows to a closed state. As another example, a seat motor actuator can be configured to receive a command from the vehicle setting adjustment module 265 to change a position and/or angle of a seat. As another example, a side mirror adjustment motor can be configured to receive a command from the vehicle setting adjustment module 265 to change the angle of a side mirror.

In embodiments, the vehicle setting adjustment module 265 can be configured to interact with a graphical user interface, a switch, a lever, or any other control such that setting adjustments can be made within a vehicle. For example, the vehicle setting adjustment module 265 can be configured to change a driving mode (e.g., cruise control, economy mode, self-driving mode) of the vehicle 200 through a control within the vehicle 200. In some embodiments, if there are settings that cannot be automatically adjusted by the vehicle setting adjustment module 265, the vehicle setting adjustment module 265 can be configured to transmit a notification to a user regarding the setting adjustment to be made.

Upon adjusting the settings within the vehicle 200, the user can be prompted regarding whether the vehicle settings are satisfactory. If the user accepts the settings as satisfactory, the settings can be associated with a template 230 storing the characteristics which yielded the settings (in instances where a template was not used to retrieve and enable the settings). If the user rejects the settings as unsatisfactory, then the user can be prompted to input the correct settings. The correct settings can then be associated with a template 230 storing characteristics which yielded the settings input by the user.

FIG. 2 is intended to represent the major components of an example vehicle 200 according to embodiments of the present disclosure. In some embodiments, however, individual components can have greater or lesser complexity than shown in FIG. 2, and components other than, or in addition to those shown in FIG. 2 can be present. Furthermore, in some embodiments, various components illustrated in FIG. 2 can have greater, lesser, or different functionality than shown in FIG. 2. Further still, aspects of the present disclosure exist comprising only a subset of the components illustrated while remaining within the spirit and scope of the present disclosure. In some embodiments, functionalities of one or more components within the vehicle 200 can be completed by another device. For example, the analyzer 240 can be remotely located from the vehicle 200 and can communicate with the vehicle over a network or using a wireless link.

Figure 3:
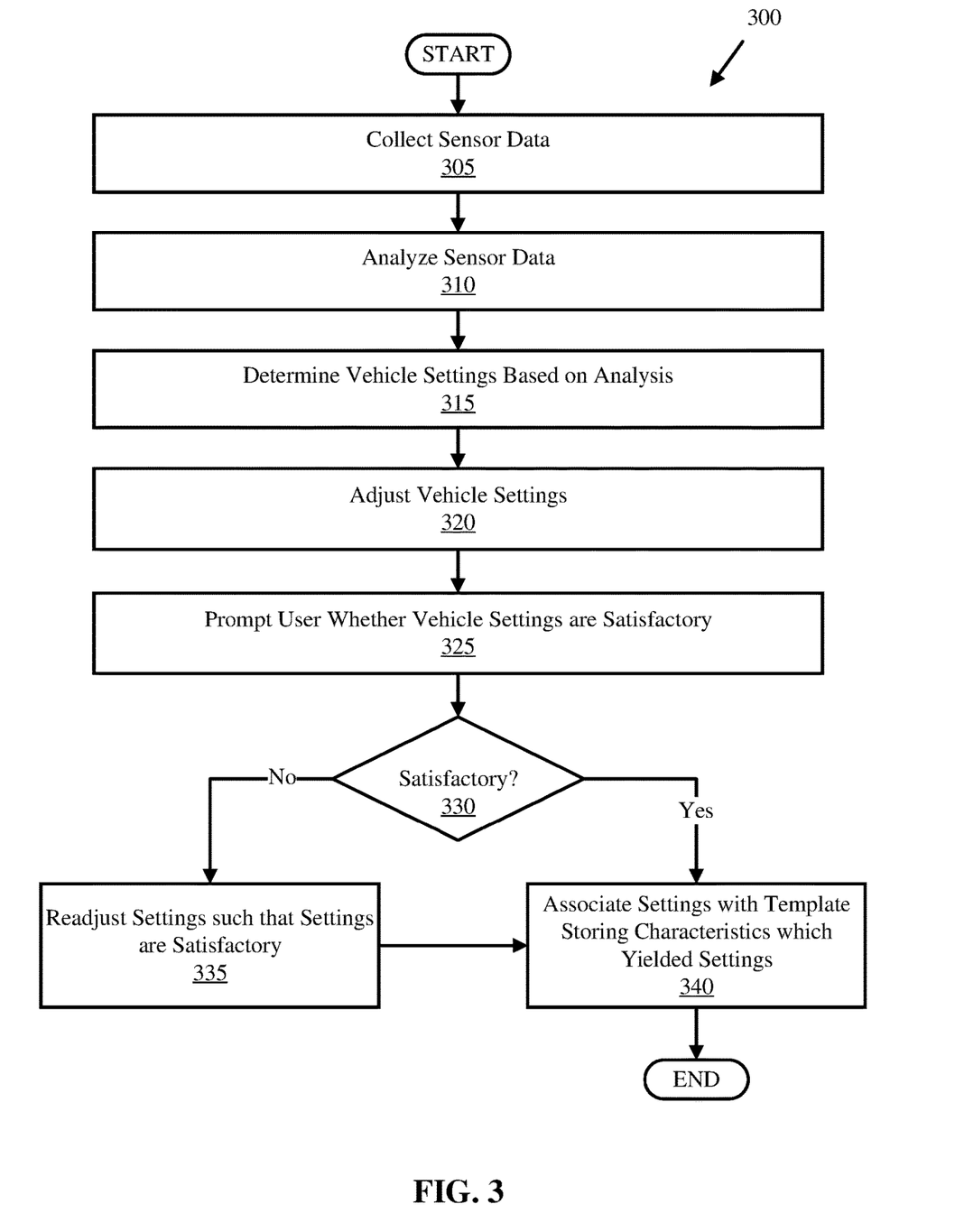
FIG. 3 is a flow diagram illustrating an example method for adjusting vehicle settings based on sensor data, in accordance with embodiments of the present disclosure.

Referring now to FIG. 3, shown is a flow diagram illustrating an example method 300 for adjusting vehicle settings based on sensor data, in accordance with embodiments of the present disclosure.

Method 300 initiates at operation 305, where sensor data is collected. The sensor data can be the same as, or substantially similar to, the sensor data described with respect to the sensor 115 of FIG. 1 or the sensors 205 of FIG. 2. For example, sensor data can be image data collected from a camera, audio data collected from a microphone, or biometric data collected from a biometric scanner.

The sensor data is then analyzed. This is illustrated at operation 310. The sensor data can be analyzed in the same, or a substantially similar, manner as described with respect to the analyzer 240 of FIG. 2. For example, images can be analyzed to determine dimensions of an individual (e.g., using photogrammetry techniques). As another example, image data can be analyzed to ascertain various objects in an image (e.g., using machine learning and/or deep learning object detection techniques).

The vehicle settings are then determined based on the analysis of the sensor data. This is illustrated at operation 315. The vehicle settings can be determined in the same, or a substantially similar, manner as described with respect to the adjustment determiner 260 of FIG. 2. For example, adjustments to vehicle settings can be based on the identity of objects determined at operation 310. As another example, vehicle settings can be dynamically determined based on dimensions of an individual (e.g., seat position, seat angle, mirror angle, etc. can be altered based on the observed height of the individual).

The vehicle settings can then be adjusted based on the determined vehicle settings. This is illustrated at operation 320. The vehicle settings can be adjusted in the same, or a substantially similar, manner as described with respect to the vehicle setting adjustment module 265 of FIG. 2. For example, one or more processing circuits of a vehicle can be configured to issue commands to actuators of the vehicle such that the vehicle settings can be adjusted.

The user is then prompted regarding whether the vehicle settings are satisfactory. This is illustrated at operation 325. The user can be prompted in any suitable manner. For example, the user can be prompted using a voice command device (VCD), graphical user interface (GUI), alert, touch notification, or any other suitable technique. The user can respond to the prompt by indicating whether the settings are satisfactory or not. In some embodiments, the user can indicate which settings are satisfactory and which settings are not satisfactory.

A determination is made whether the vehicle settings are satisfactory. This is illustrated at operation 330. The determination is made based on how the user responded to the prompt at operation 325 (e.g., "Satisfactory" or "Unsatisfactory").

If a determination is made that the vehicle settings are unsatisfactory (operation 330, "No"), then the settings are readjusted such that the settings are satisfactory. This is illustrated at operation 335. In embodiments, the settings can be readjusted by a user. For example, the user can be prompted to input their desired settings. In some embodiments, the vehicle settings can be automatically readjusted by the vehicle. For example, the vehicle can be configured to prompt the user to prepare for additional sensor data collection (e.g., the user can be asked to exit the vehicle such that additional sensor data can be collected). Based on the additional sensor data (e.g., additional images of a user), the settings can be updated. For example, if the dimensions of the user were inaccurate, the user can be prompted to exit the vehicle such that additional images can be collected and analyzed. The vehicle settings can then be adjusted based on the newly determined dimensions.

If a determination is made that the vehicle settings are satisfactory (operation 330, "Yes"), or alternatively, upon readjusting the settings such that the vehicle settings are satisfactory, then the vehicle settings are associated with a template storing the characteristics which yielded the vehicle settings. This is illustrated at operation 340. For example, if the vehicle settings are adjusted based on an observation of a first object and a first height measurement of a first user, then a template can be generated based on the first object and the first height measurement. If the first object and first height are observed in the future, then the observed characteristics can be matched to the template such that the corresponding vehicle settings can be retrieved and enabled. Upon associating the vehicle settings with a new template, method 300 ends.

The aforementioned operations can be completed in any practical order and are not limited to those described. Additionally, some, all, or none of the aforementioned operations can be completed, while still remaining within the spirit and scope of the present disclosure.

Figure 4:
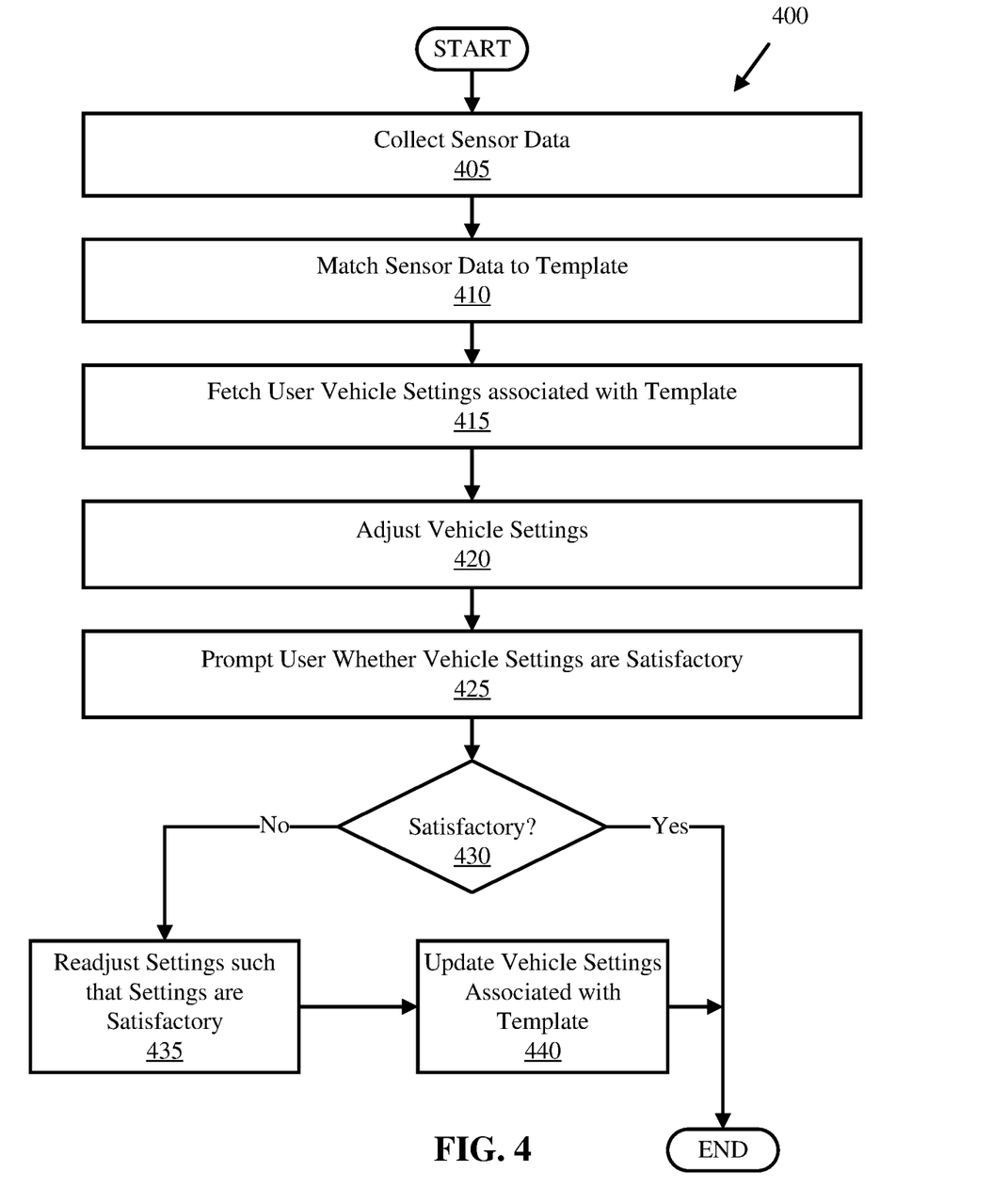
FIG. 4 is a flow diagram illustrating an example method for adjusting vehicle settings based on a template, in accordance with embodiments of the present disclosure.

Referring now to FIG. 4, shown is a flow diagram illustrating an example method 400 for adjusting vehicle settings by referencing a template, in accordance with embodiments of the present disclosure.

Method 400 initiates at operation 405, where sensor data is collected. The sensor data can be the same as, or substantially similar to, the sensor data described with respect to the sensor 115 of FIG. 1 or the sensors 205 of FIG. 2. For example, sensor data can be image data collected from a camera, audio data collected from a microphone, or biometric data collected from a biometric scanner.

The sensor data is then matched to a template. This is illustrated at operation 410. The sensor data can be matched to a template in the same, or a substantially similar, manner as described with respect to the template matcher 245 of FIG. 2. For example, a biometric sample (e.g., a facial sample, voice sample, fingerprint sample, etc.) captured by a sensor can be compared with a biometric template stored within a template using a matching algorithm (e.g., fuzzy commitment). As another example, objects associated with a user (identified by an object detection algorithm) can be compared with objects stored within a template to determine whether a match occurs between the sensor data and the template. As another example, dimensions of a user (e.g., determined using photogrammetry techniques) can be compared with dimensions stored within a template to determine whether a match occurs.

In some embodiments, there may be some variation between the sensor data and template, while still allowing a match to occur. This can depend on the specific matching algorithm that is applied and/or the set error allowances. For example, a matching criterion may specify that only three out of four objects of a template are required to match. As another example, a matching criterion may specify that a height dimension of a template can allow variability of ±2 inches.

The vehicle settings associated with the template are then fetched. This is illustrated at operation 415. In embodiments, each template is mapped to a corresponding set of vehicle settings, such that when a template match occurs, a corresponding set of vehicle settings is retrieved. The association between the vehicle settings and template can be made upon generation of a new template and may correspond to operation 340 of FIG. 3. For example, when vehicle settings have been confirmed as satisfactory by an individual, the characteristics which yielded the vehicle settings can be stored as a new template and automatically associated with the vehicle settings.

The vehicle settings can then be adjusted per the fetched vehicle settings associated with the template. This is illustrated at operation 420. The vehicle settings can be adjusted in the same, or a substantially similar, manner as described with respect to the vehicle setting adjustment module 265 of FIG. 2. For example, one or more processing circuits of a vehicle can be configured to issue commands to actuators of the vehicle such that the vehicle settings can be adjusted.

The user is then prompted regarding whether the vehicle settings are satisfactory. This is illustrated at operation 425. The user can be prompted in any suitable manner. For example, the user can be prompted using a voice command device (VCD), graphical user interface (GUI), alert, touch notification, or any other suitable technique. The user can respond to the prompt by indicating whether the settings are satisfactory or not. In some embodiments, the user can indicate which settings are satisfactory and which settings are not satisfactory.

A determination is made whether the vehicle settings are satisfactory. This is illustrated at operation 430. The determination is made based on how the user responded to the prompt at operation 425 (e.g., "Satisfactory" or "Unsatisfactory").

If a determination is made that the vehicle settings are satisfactory (operation 430 "Yes"), then method 400 ends. If a determination is made that the vehicle settings are unsatisfactory (operation 430 "No"), then the settings are readjusted such that the settings are satisfactory. This is illustrated at operation 435. In embodiments, the settings can be readjusted by a user. For example, the user can be prompted to input their desired settings. In some embodiments, the vehicle settings can be automatically readjusted by the vehicle. For example, the vehicle can be configured to prompt the user to prepare for additional sensor data collection (e.g., the user can be asked to exit the vehicle such that additional sensor data can be collected). Based on the additional sensor data (e.g., additional images of a user), the settings can be updated (based on a different template). For example, if the individual was incorrectly identified using facial recognition, the user can be prompted to exit the vehicle such that additional facial samples can be collected and analyzed. The vehicle settings can then be adjusted based on the correct individual identity.

The vehicle settings associated with the template are then updated. This is illustrated at operation 440. For example, if the vehicle settings associated with the template were incorrectly configured, they can be updated per the readjustment at step 435. Upon updating the vehicle settings associated with the template, method 400 ends.

The aforementioned operations can be completed in any order and are not limited to those described. Additionally, some, all, or none of the aforementioned operations can be completed, while still remaining within the spirit and scope of the present disclosure. For example, in some embodiments, operation 440 may not be completed, as the wrong template for the user may have been retrieved rather than the settings for the template being incorrect.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
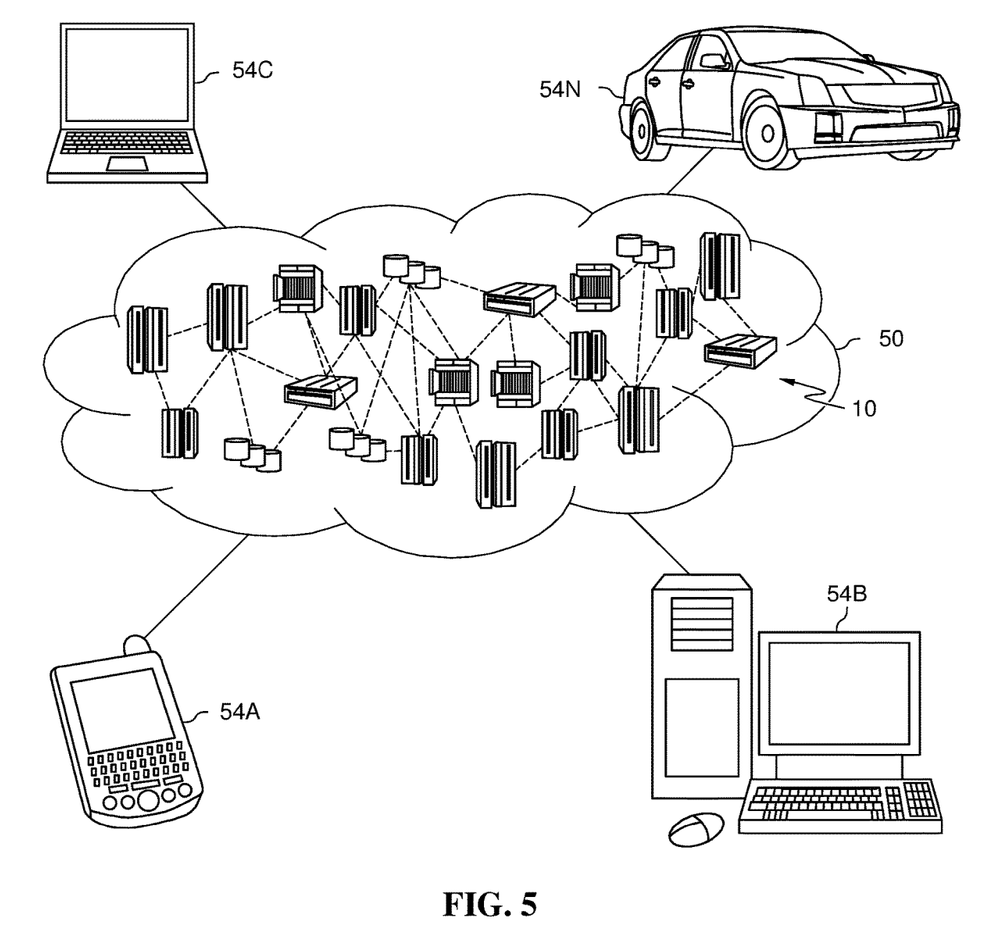
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., sensor 115, sensor 205), desktop computer 54B, laptop computer 54C, and/or automobile computer system 54N (e.g., vehicle 110, vehicle 200) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
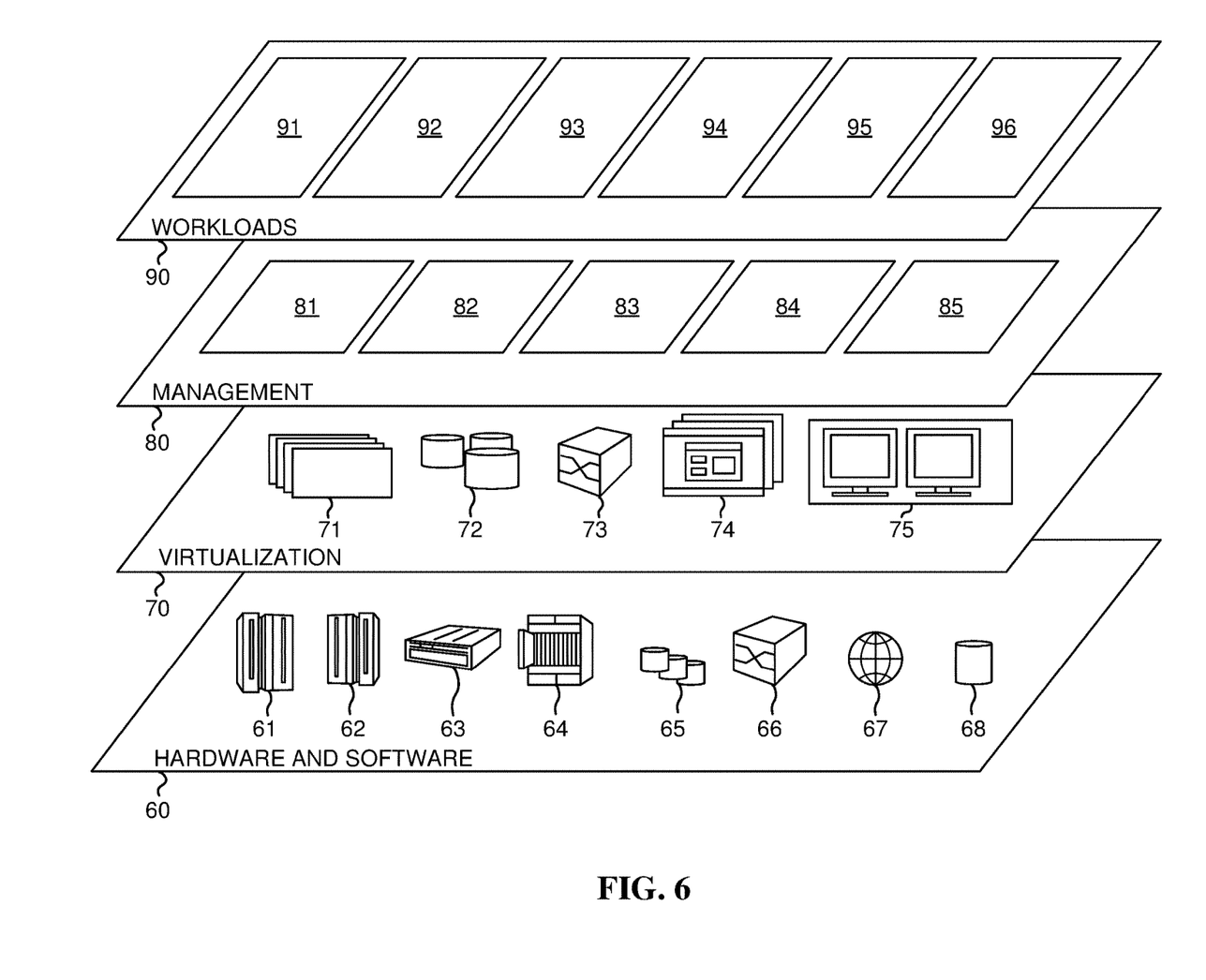
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle setting adjustment 96.

Figure 7:
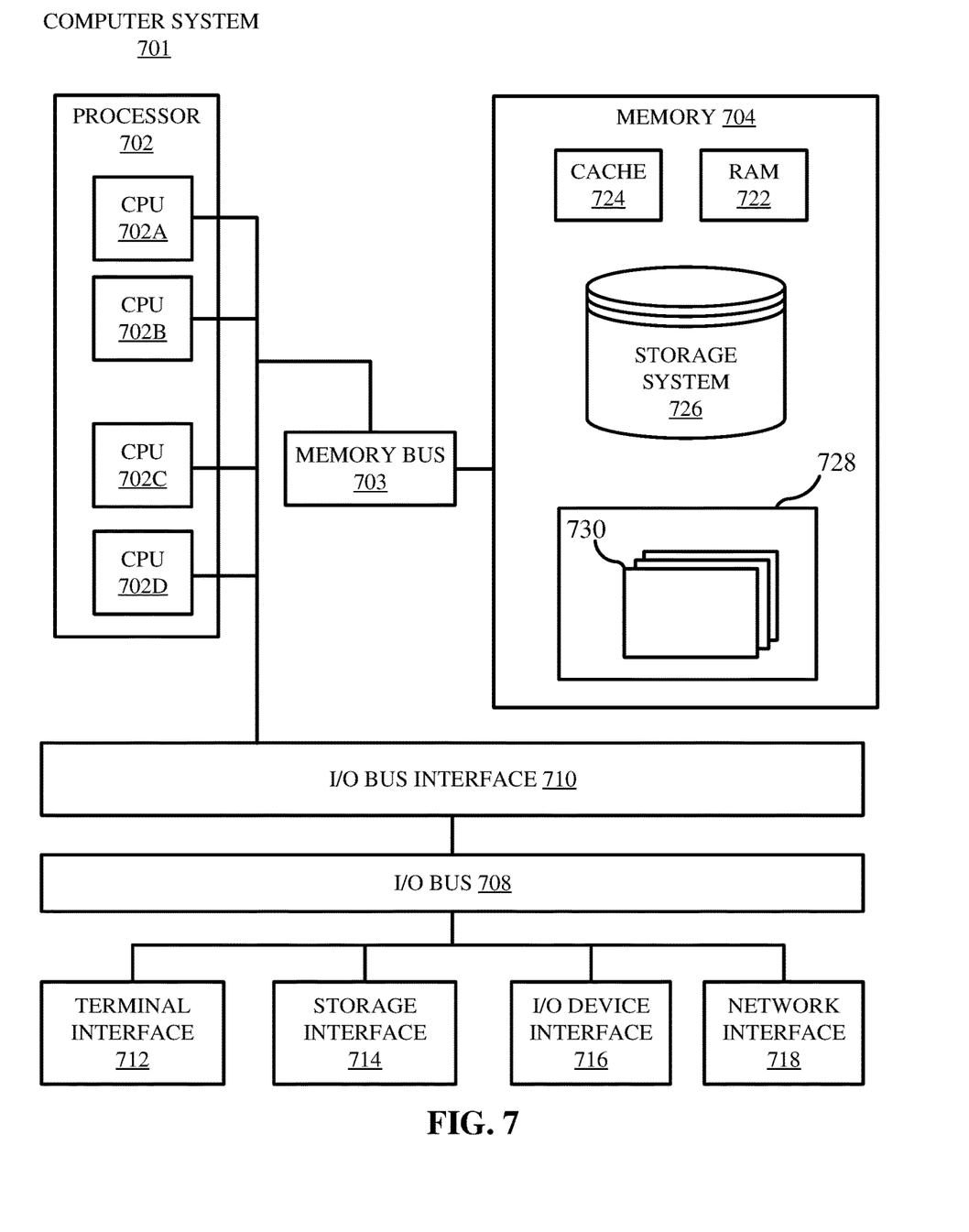
FIG. 7 is a high-level block diagram illustrating an example computer system that may be used in implementing one or more of the methods, tools, and modules, and any related functions described herein, in accordance with embodiments of the present disclosure.

Referring now to FIG. 7, shown is a high-level block diagram of an example computer system 701 that may possibly be utilized in various devices discussed herein (e.g., sensor 115, sensors 205, vehicle 110, vehicle 200) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

In some embodiments, the program modules 730 of the computer system 701 may include a vehicle setting adjustment module. The vehicle setting adjustment module can be configured to collect sensor data of an individual. The sensor data can be matched to a template. The vehicle setting adjustment module can further be configured to determine a set of vehicle settings associated with the template. The set of vehicle settings can then be activated within a vehicle.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
    collecting sensor data of an individual approaching a vehicle, wherein collecting sensor data includes determining dimensions of the individual approaching the vehicle, determining objects associated with the individual approaching the vehicle, and determining an identity of the individual approaching the vehicle;
    identifying a template that matches the sensor data, the template defining a set of vehicle settings that are activated based on the determined dimensions of the individual, the determined objects of the individual, and the determined identity of the individual; and
    activating, in response to identifying the template that matches the sensor data, the set of vehicle settings defined within the template within the vehicle.

2. The method of claim 1, wherein an identity of each object associated with the individual approaching the vehicle is determined using a region-based convolutional neural network.

3. The method of claim 1, further comprising:
    prompting the individual regarding whether the set of vehicle settings is satisfactory;
    readjusting, in response to the set of vehicle settings not being satisfactory, the set of vehicle settings; and updating, based on the readjusting, the set of vehicle settings associated with the template.

4. A system comprising:
a vehicle having one or more processing circuits; and
a computer-readable storage medium storing instructions, which, when executed by the one or more processing circuits, are configured to cause the one or more processing circuits to perform a method comprising:
collecting sensor data of an individual approaching a vehicle;
analyzing the sensor data, wherein analyzing the sensor data includes determining dimensions of the individual approaching the vehicle, determining objects associated with the individual approaching the vehicle, and determining an identity of the individual approaching the vehicle;
determining a set of vehicle settings based on the determined dimensions of the individual, the determined objects associated with the individual, and the determined identity of the individual;
activating the set of vehicle settings; and
associating the set of vehicle settings with a template, the template defining a set of vehicle settings that are activated based on the determined dimensions of the individual, the determined objects associated with the individual, and the determined identity of the individual.

5. The system of claim 4, wherein the set of vehicle settings are associated with the template in response to an indication that the set of vehicle settings are satisfactory by the individual.

6. The system of claim 4, wherein the sensor data includes image data, wherein analyzing the sensor data includes performing object detection on the image data to identify the objects associated with the individual within the image data.

7. The system of claim 6, wherein the identity of the objects associated with the individual are determined using a region-based convolutional neural network.

8. The system of claim 4, wherein the sensor data includes image data, wherein analyzing the image data includes performing photogrammetry on the image data to determine the dimensions of the individual.

9. The system of claim 8, wherein the set of vehicle settings are determined based on a height of the individual indicated in the dimensions of the individual.

10. The system of claim 9, wherein a seat position and a mirror position within the set of vehicle settings are based on the height of the individual.

11. The system of claim 4, further comprising:
collecting, at a later time, sensor data of the individual approaching the vehicle;
analyzing the sensor data to determine dimensions of the individual, objects associated with the individual, and the identity of the individual;
identifying the template matching the determined dimensions of the individual, determined objects associated with the individual, and the determined identity of the individual;
activating, responsive to identifying the template, the set of vehicle settings associated with the template.

12. A computer program product comprising a computer readable storage medium having program instructions embodied therewith, wherein the computer readable storage medium is not a transitory signal per se, the program instructions executable by one or more processing circuits of a vehicle to cause the one or more processing circuits to perform a method comprising:
collecting sensor data of an individual approaching a vehicle, wherein collecting sensor data includes determining dimensions of the individual approaching the vehicle, determining objects associated with the individual approaching the vehicle, and determining an identity of the individual approaching the vehicle;
identifying a template that matches the sensor data, the template defining a set of vehicle settings that are activated based on the determined dimensions of the individual, the determined objects of the individual, and the determined identity of the individual; and
activating, in response to identifying the template that matches the sensor data, the set of vehicle settings defined within the template within the vehicle.

13. The computer program product of claim 12, wherein the sensor data includes audio and image data, wherein the objects associated with the individual approaching the vehicle are determined using object detection on the image data, wherein the identity of the individual is determined using voice recognition.

14. The computer program product of claim 12, wherein the method performed by the one or more processing circuits further comprises:
prompting the individual regarding whether the set of vehicle settings is satisfactory;
readjusting, in response to the set of vehicle settings not being satisfactory, the set of vehicle settings; and
updating, based on the readjusting, the set of vehicle settings associated with the template.

15. The computer program product of claim 12, wherein the set of vehicle settings within the vehicle are activated, by the one or more processing circuits, using one or more actuators or controls within the vehicle.

16. The computer program of claim 12, wherein determining objects associated with the individual includes, detecting, via object detection performed on image data of the individual approaching the vehicle, at least two objects associated with the individual;
wherein the at least two objects are mapped to a vehicle setting of the set of vehicle settings within the template.

17. The computer program product of claim 12, wherein the set of vehicle settings defined by the template include:
a seat position and angle based on the determined dimensions of the individual;
a steering wheel position based on the determined dimensions of the individual;
a window setting based on attire of the individual within the determined objects associated with the individual;
a heating and cooling setting based on attire of the individual within the determined objects associated with the individual; and
a driving mode of the vehicle based on the determined identity of the individual.

* * * * *